Figure 2:
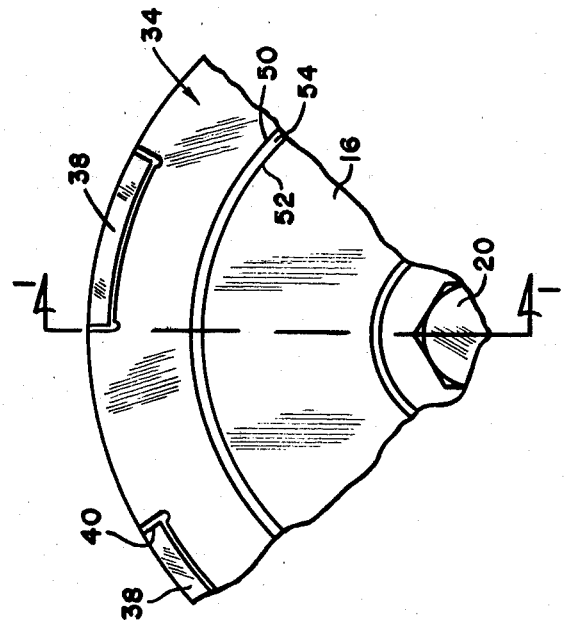

United States Patent [19]

Yew

[11] 4,397,380
[45] Aug. 9, 1983

[54] FAIL SAFE ELECTROMAGNETIC CLUTCH

[75] Inventor: Kwang Yew, Chatham, Canada

[73] Assignee: Canadian Fram Limited, Chatham, Canada

[21] Appl. No.: 299,696

[22] Filed: Sep. 8, 1981

[51] Int. Cl.³ ............................................. F16D 7/02
[52] U.S. Cl. ................................ 192/84 C; 192/89 B; 192/90; 192/107 C; 310/78; 310/92
[58] Field of Search .................. 192/90, 107 C, 111 A, 192/40, 35; 310/76–78, 92

[56] References Cited

U.S. PATENT DOCUMENTS

| | | | |
|---|---|---|---|
| 2,888,119 | 5/1959 | Vissing | 192/70.19 |
| 3,313,385 | 4/1967 | Förster | 192/89 B |
| 3,732,447 | 5/1973 | Perhats | 310/77 |
| 4,030,583 | 6/1977 | Miller | 192/111 A |
| 4,258,836 | 3/1981 | Miller | 192/84 C |
| 4,285,420 | 8/1981 | Sekella | 192/84 C |

Primary Examiner—J. D. Miller
Assistant Examiner—D. L. Rebsch
Attorney, Agent, or Firm—Markell Seitzman; Russell C. Wells

[57] ABSTRACT

Fail safe electromagnetic clutch (10) includes a driving member (12) and a driven member (16). Engagement structure (30) cushions engagement between the driving member (12) and driven member (16) when the clutch is engaged. The engagement structure (30) includes a pair of elements (36, 34) and a resilient wave washer (42) located therebetween. The waver washer (42) biases the element (36) into driving engagement with the driving member (12) and biases the element (34) into driving engagement with the driven member (16). When the clutch is disengaged, a magnetic coil (22) forces the element (34) away from the driven member (16), thereby collapsing the wave washer (42). When the clutch is to be re-engaged, the coil (22) is de-energized, thereby permitting the wave washer (42) to drive the element (34) back into driving engagement with the driven member (16). Accordingly, there is a conical clutching surface between the engagement structure (30) and the driven member (16) and a disc engagement surface between the engagement structure (30) and the driving member (12). Therefore, upon engagement of the clutch, the conical engagement surface (50, 52) slips briefly, and the disc engagement surfaces (37, 39) slip until the clutch is fully engaged, thereby cushioning engagement of the clutch to minimize the inertial shock that would otherwise occur when the clutch (10) is engaged.

14 Claims, 2 Drawing Figures

FAIL SAFE ELECTROMAGNETIC CLUTCH

This invention relates to a fail safe electromagnetic clutch.

Fail safe electromagnetic clutches have been proposed before. These clutches have included a driving member and a driven member retainable about a common axis, an electromagnetic actuator for controlling engagement and disengagement of the members, engagement structure carried by the members, a spring for urging the engagement structure toward a condition drivingly engaging said members for rotation together, said electromagnetic actuator being energized to move said engagement structure away from the drivingly engaging position to thereby disengage said one member from rotation with the other member.

Prior art clutches of this type are disclosed in U.S. Pat. No. 4,030,583, issued June 21, 1977 to Miller and in U.S. Pat. No. 4,258,836, issued Mar. 31, 1981 also to Miller. Both of these prior art patents disclose an electromagnetic fail safe clutch in which the driving and driven members are normally biased into driving engagement with one another by a spring or other resilient member. These clutches are disengaged by energization of an electromagnetic oil, which moves an armature in opposition to the spring force to permit the clutch to disengage as long as the coil remains energized. Clearly, clutches of this type remain engaged at all times if the coil becomes defective or if a lead connecting the coil to the power supply breaks, so that failures of this nature will not cause an accessory operated by the clutch to become inoperable. Although these clutches have many uses in the automotive and industrial equipment fields, they are primarily used to drive belt-driven engine accessories on an automotive vehicle. For example, automotive vehicles may have clutches of this nature in the engine cooling fan drive system. Accordingly, these clutches permit the fan to be disengaged when it is not needed, but the fail safe feature assures that the fan will be driven at all times in case a defect or failure interrupts power to the clutch.

The devices discussed above present drawbacks because they tend to engage and disengage abruptly. For example, the instant the electromagnetic coil used in the foregoing devices is de-energized, the clutch automatically engages, which, because of the inertia of the components driven by the clutch, may cause undesirably large shock loads. The present invention permits overcoming these drawbacks by providing a cushioned or slip engagement of the clutch members, so that the accessories driven by the clutch may be gradually brought up to full engine driven speed, to thereby avoid the inertial shock inherent when a stationary accessory is suddenly accelerated to some predetermined fraction of the engine speed.

Accordingly, the fail safe electromagnetic clutch of the present invention is characterized in that the engagement structure is mounted for rotation with respect to both the driving and driven members, so that the engagement structure permits the members to slip relative to each other when the members are placed in driving engagement to thereby cushion engagement of the clutch.

Therefore, the advantages of the present invention include the elimination of high shock loads on accessories driven through the clutch when the latter is engaged and the provision of limited slip between the clutch members to cushion engagement of the clutch.

Figure 1:
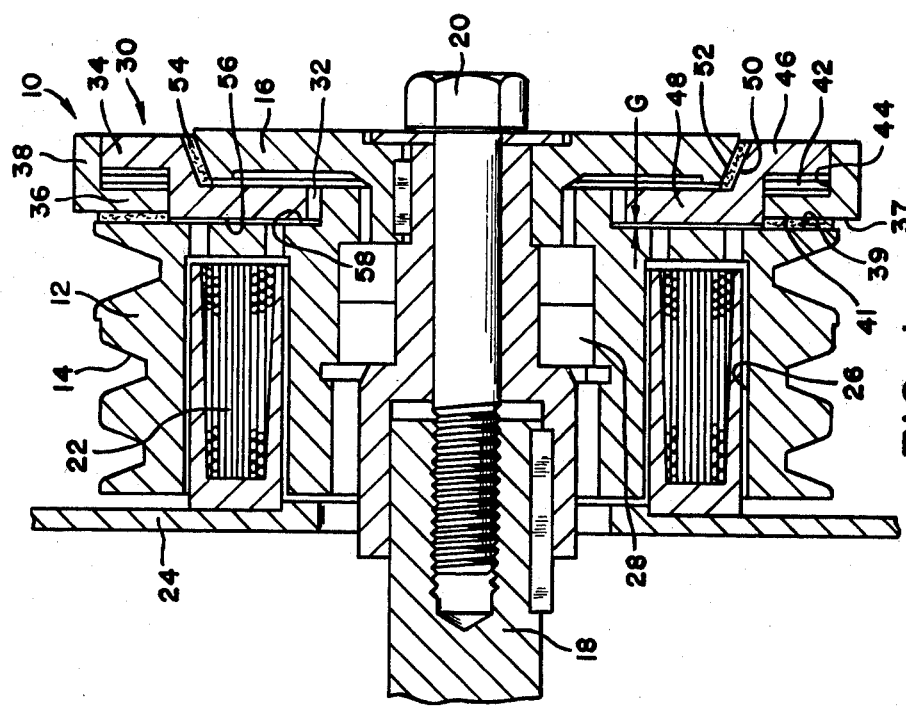

Other features and advantages will appear in the following description with reference to the accompanying drawings in which:

FIG. 1 is an axial cross-sectional view of a fail safe electromagnetic clutch made pursuant to the teachings of my present invention; and FIG. 2 is a side elevational view of the clutch illustrated in FIG. 1.

Referring now to the drawing, a fail safe electromagnetic clutch generally indicated by the numeral 10 includes a driving member 12 which is driven, for example, by the engine of a motor vehicle, through a belt-driven pulley face 14. A driven member 16 is connected to an appropriate engine driven accessory (not shown) through a driving spindle 18 connected to the driven member 16 through connecting structure including bolt 20. An electromagnetic coil 22 is mounted on a fixed support 24 which is attached to a non-rotating part of the vehicle. The coil 22 is carried in annular cavity 26 defined within the driving member 12. The driving member 12 is mounted for rotation relative to the driven member 16 by bearings 28.

Engagement structure generally indicated by the numeral 30 is provided to cushion the driving engagement of the member 12 with the member 16. Structure 30 is mounted for rotation relative to the member 12 by a bearing 32. The engagement structure 30 includes relatively movable elements 34, 36. Element 36 includes axially projecting tabs 38 which engage slots 40 provided in the element 34 so that the elements 34, 36 are connected for rotation together, yet limited axial movement therebetween is permitted. An annular face 37 on element 36 defines a disc engagement surface which cooperates with a corresponding disc engagement surface 39 on the member 12. A band of friction material 41 may be carried on the engagement surface 37 or 39. A conventional wave washer 42 is installed in a cavity 44 defined between the elements 34, 36, and yieldably biases the elements 34, 36 away from one another.

The element 34 includes axially offset portions 46, 48 which cooperate to define a tapering shoulder 50 therebetween which acts as a conical engagement surface, as will be described in detail hereinafter. The engagement surface 50 cooperates with another conical engagement surface 52 carried on the driven member 16 when the clutch is engaged to provide a driving connection between the members. A conical band of friction material 54 may be carried on either of the surfaces 50 or 52. Element 34 further includes an annular face 56 which cooperates with a face 58 on the member 12 to define a gap G therebetween. As will be discussed in detail hereinafter, upon energization of the coil 22, the element 34 acts as an armature and is drawn towards the face 58, thereby closing the gap G.

In operation, the various components of the clutch 10 are illustrated in the drawings in the positions which they assume when the coil 22 is de-energized. In this condition, the wave washer 42 biases the engagement surface 37 towards the engagement surface 39 and also biases the engagement surface 50 towards the engagement surface 52. Accordingly, a driving engagement is established between the members 12 and 16 through the elements 34 and 36. In this condition, a gap G exists between the face 56 on the element 34 and the face 58 on the member 12. When the clutch 10 is to be disengaged, the coil 22 is energized, thereby drawing the element 34 to the left, viewing FIG. 1, to close the gap G and to compress the wave washer 42. Therefore, the engagement surface 50 is moved to the left viewing FIG. 1, thereby breaking the driving connection with the engagement surface 52, to permit the driving member 12 to rotate relative to the driven member 16.

When the clutch is to be engaged, the coil 22 is de-energized. The de-energization of the coil 22 can occur either intentionally when the clutch is to be re-engaged, or unintentionally due to a power failure or other malfunction. In either event, the clutch 10 is automatically engaged to form a driving connection between the members 14 and 16. When the coil 22 is de-energized, the wave washer 42 urges the elements 34 and 36 away from one another, thereby driving the element 34 back into driving engagement with the member 16 through the engagement surfaces 50 and 52 and the friction material 54. Since the conical engagement surfaces 50 and 52 have more engaging torque capability than the disc engagement surfaces 37 and 39, the conical engagement surfaces 50 and 52 will slip relative to one another for a moment upon engagement of the clutch. However, since the engagement force between the engaging surfaces 37 and 39 through the friction material 41 is reduced because of the relaxation of the wave washer 42, the disengagement of surfaces 37 and 39 will cause the members to slip relative to one another until the clutch becomes fully engaged. In this way, inertial shock loads upon engagement of the clutch are minimized, and damage to the belt-driven accessory, which would normally occur upon abrupt engagement of the clutch, is avoided.

I claim:

1. A fail safe electromagnetic clutch having a driving member and a driven member rotatable about a common axis, an electromagnetic actuator for controlling engagement and disengagement of said members, engagement structure carried by said members, yieldable means for urging said engagement structure toward a condition drivingly engaging said members for rotation together, said electromagnetic actuator being energized to move said engagement structure away from the drivingly engaging condition to thereby disengage one of said members from rotation with the other member, characterized in that said engagement structure is mounted for rotation with respect to both of said members for permitting said members to slip relative to each other when the members are placed in driving engagement.

2. Fail safe electromagnetic clutch as claimed in 1, further characterized in that said engagement structure has a pair of engagement surfaces, one of said engagement surfaces engaging said one member and the other of said engagement surfaces engaging said other member when the clutch is engaged.

3. Fail safe electromagnetic clutch as claimed in claim 2, further characterized in that said engagement structure includes a pair of elements movable relative to one another, said yieldable means urging said elements away from one another to thereby force one of said elements into driving engagement with said one member and the other element into driving engagement with said other member.

4. Fail safe electromagnetic clutch as claimed in claim 3, further characterized in that one of said elements includes axially offset positions, said one member having a face extending parallel to one of said offset portions, said yieldable means urging said one element away from said face, said electromagnetic actuator being energized to disengage said clutch by forcing said one portion toward said face.

5. Fail safe electromagnetic clutch as claimed in claim 4, further characterized in that said other engagement surface is carried on the side of said one element opposite the side of said one element engaging said face when said electromagnetic actuator is energized, said yieldable means yieldably urging said one element and therefore said other engagement surface toward said other member for engagement therewith when the clutch is engaged, said electromagnetic actuator being energizable to move said other engagement surface away from said other member.

6. Fail safe electromagnetic clutch as claimed in claims 4 or 5, further characterized in that the one engagement surface is carried on the other element, said yieldable means urging said other element away from said one element whereby said one engagement surface is urged into engagement with said one member, said electromagnetic actuator, when energized, forcing said one element toward the other element and therefore toward said one member to thereby compress said resilient means.

7. Fail safe electromagnetic clutch as claimed in claim 1, further characterized in that said engagement structure includes a pair of elements movable relative to one another parallel to said axis, said yieldable means urging said elements away from one another to thereby force one of said elements into driving engagement with said one member and the other element into driving engagement with said other member.

8. Fail safe electromagnetic clutch as claimed in claim 7, further characterized in that one of said elements includes axially offset portions, said one member having a face extending parallel to one of said offset portions, said yieldable means urging said one element away from said face, said electromagnetic actuator being energized to disengage said clutch by forcing said one portion toward said face.

9. In a clutch, a driving member and a driven member rotatable about a common axis, and engagement structure for engaging said clutch to cause said members to rotate together and disengaging said clutch to permit relative rotation between said members, said engagement structure being rotatable relative to both said members, said engagement structure having a pair of engaging surfaces for engagement with said driven and driving members, and selectively operable means to cause said engagement structure to engage and disengage the engagement surfaces on the structure with said driving and driven members.

10. A clutch as claimed in claim 9, wherein said engagement structure includes a pair of elements movable relative to one another parallel to said axis, and yieldable means urging said elements away from each other and toward each of said members whereby the engagement surfaces carried by the engagement structure engage the driving and driven members.

11. A clutch as claimed in claims 9 or 10 wherein said selectively operable means is an electromagnetic coil.

12. A clutch as claimed in claim 10, wherein one of said elements includes axially offset portions, one of said members having a face extending parallel to one of said offset portions, said yieldable means urging said one element away from said face, said selectively operable means being an electromagnetic actuator energizable to disengage said clutch by forcing said one portion in engagement with said face.

13. A clutch as claimed in claim 12 wherein one of said engagement surfaces is carried on the side of said one element opposite the side engaging said face when the electromagnetic actuator is energized, said yieldable means yieldably urging said one element and therefore said engagement surface toward the other of said members for engagement therewith when the electromagnetic actuator is energized, the other of said engagement surfaces being opposite the side of the latter engaging said face, said electromagnetic actuator being energizable to move said other engagement surface away from said other member.

14. A clutch as claimed in claim 13, wherein the other of said engagement surfaces is carried on the other element, said yieldable means urging the other element into engagement with said one member, said electromagnetic actuator when energized forcing said one element toward the other element and therefore toward said one member to thereby compress said resilient means.

* * * * *